United States Patent
Goulet

[11] Patent Number: 5,988,295
[45] Date of Patent: Nov. 23, 1999

[54] ADJUSTABLE GRATING ATTACHMENT FOR GRADING SOIL

[76] Inventor: Luc Goulet, 12 rue St. Maurice, St. Jean Que, Canada, J3B 3Y5

[21] Appl. No.: 09/250,835

[22] Filed: Feb. 16, 1999

[51] Int. Cl.[6] .................................................. A01B 59/048
[52] U.S. Cl. ............................................. 172/810; 172/817
[58] Field of Search ................................... 172/273, 810, 172/811, 815, 816, 456, 497, 500, 506

[56] References Cited

U.S. PATENT DOCUMENTS

| | | | |
|---|---|---|---|
| 410,768 | 9/1889 | Rowell | 172/506 X |
| 706,040 | 8/1902 | Faure | 172/506 X |
| 898,695 | 9/1908 | Sosa | 172/612 |
| 1,009,667 | 11/1911 | Humberger | 172/612 |
| 1,030,700 | 6/1912 | Achenbach | 172/506 X |
| 1,201,982 | 10/1916 | Pitts et al. | 172/506 X |
| 1,358,057 | 11/1920 | Cady | 172/506 X |
| 1,367,536 | 2/1921 | Byrum | 172/506 X |
| 1,472,949 | 11/1923 | Tucker | 172/612 |
| 1,505,204 | 8/1924 | Johnson | 172/506 |
| 1,530,329 | 3/1925 | Roberts | 172/612 |
| 1,620,969 | 3/1927 | Hester | 172/506 |
| 1,656,354 | 1/1928 | Hester | 172/506 X |
| 1,775,245 | 9/1930 | Key | 172/506 X |
| 2,577,384 | 12/1951 | Toland | 172/506 X |
| 3,135,080 | 6/1964 | Christiansen | 172/506 X |
| 3,266,230 | 8/1966 | Rowbotham | 172/506 X |
| 3,858,663 | 1/1975 | Lurwig, Jr. | 172/447 |
| 4,572,301 | 2/1986 | Bourgeols, Jr. | 172/445.1 |
| 4,836,295 | 6/1989 | Estes | 172/612 X |
| 4,886,127 | 12/1989 | Kleinhuizen | 172/612 X |
| 4,976,052 | 12/1990 | Jeane | 37/109 |
| 5,284,211 | 2/1994 | Tozer | 172/612 X |
| 5,806,606 | 9/1998 | Robinson | 172/506 X |

*Primary Examiner*—Christopher J. Novosad

[57] ABSTRACT

An accessory that can be attached to any of a variety of heavy machinery such as bulldozers, backhoes, tractors, etc, is used for a final grading and leveling pass and is comprised of, a grating having a lattice arrangement with a "V" pattern and a set of springs disposed at each side of a hydraulic piston which controls the level of the grating.

4 Claims, 2 Drawing Sheets

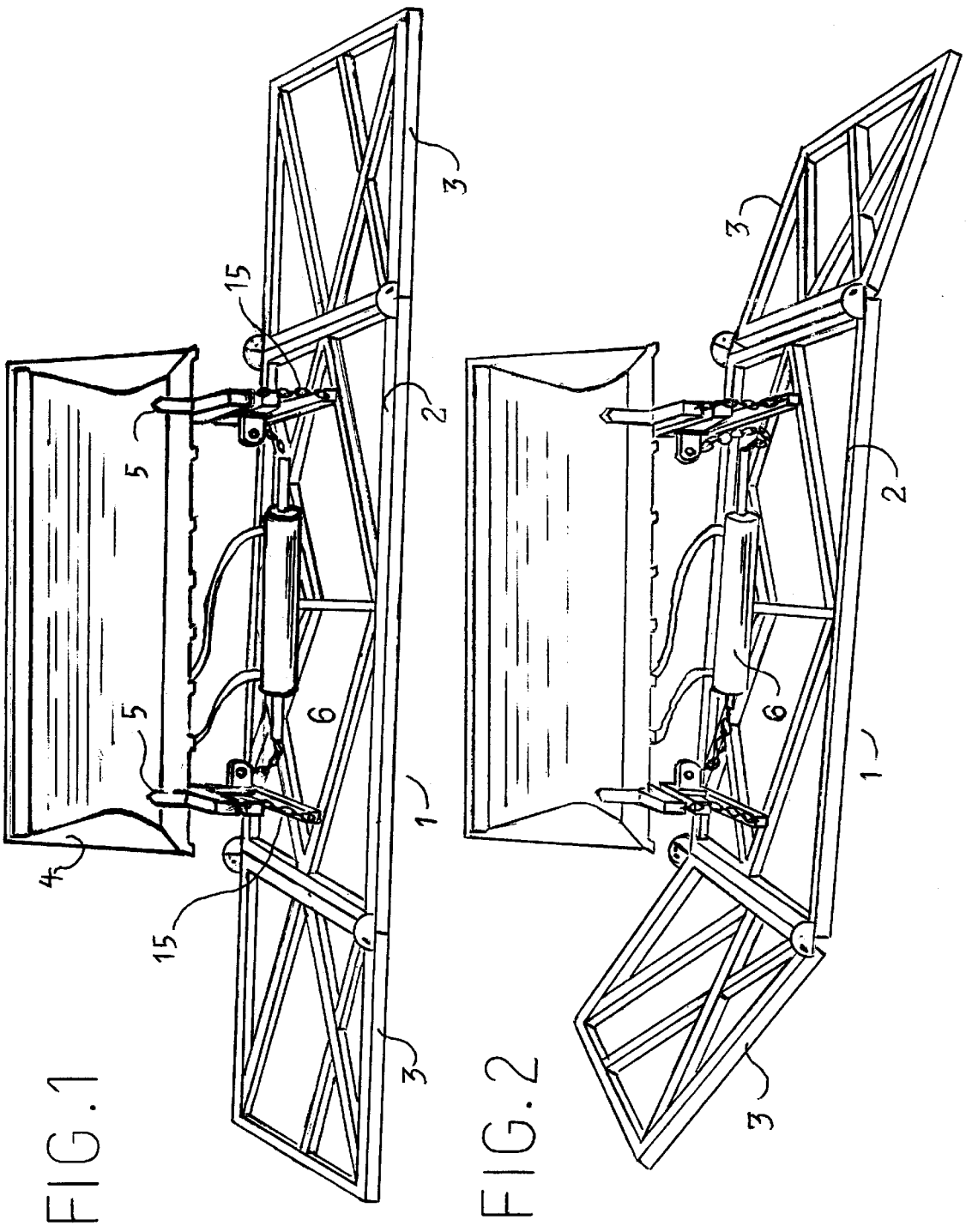

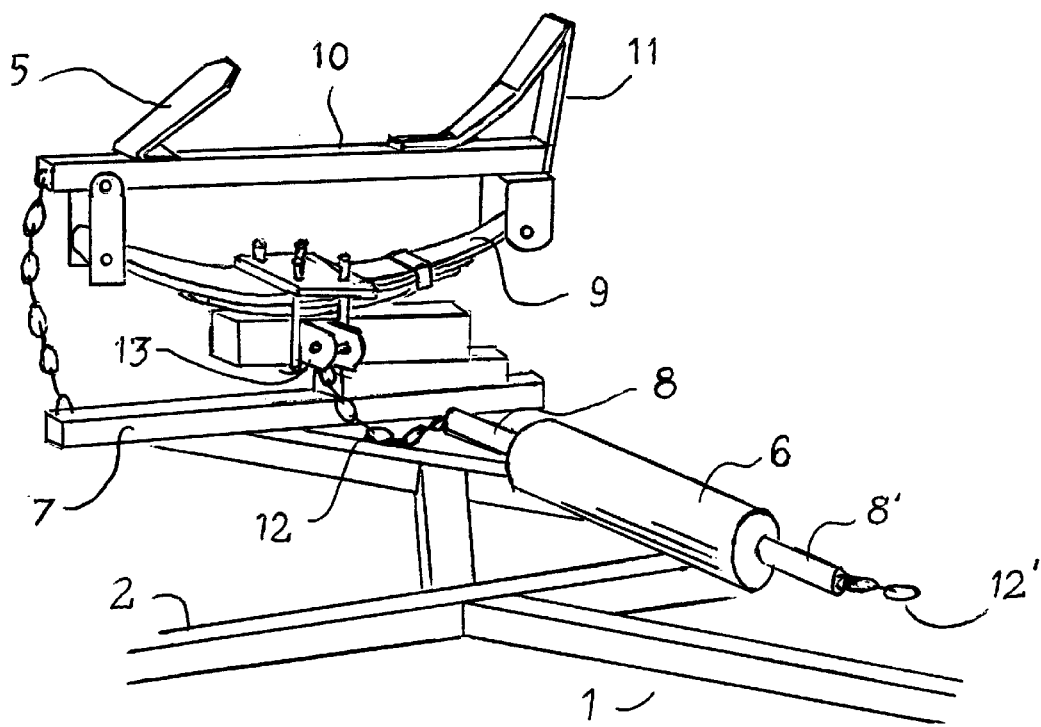
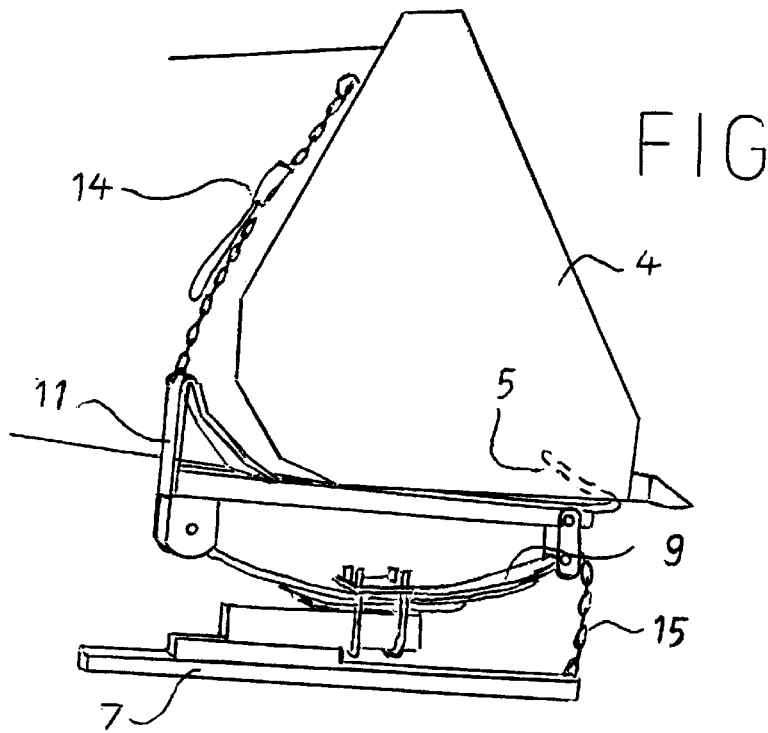

ADJUSTABLE GRATING ATTACHMENT FOR GRADING SOIL

BACKGROUND OF THE INVENTION

This invention is an accessory that can be attached to the bucket of any of a variety of heavy machinery such as bulldozers, backhoes, tractors, etc, and is used for a final grading and leveling pass.

1. Field of the Invention

This invention relates to the field of heavy duty earth moving equipment apparatus or tooling in general but more specifically to means of leveling and grading filling materials.

2. Description of the Relevant Art

In most types of soil surfacing work such as road construction, landscaping, parking lots and any other areas where leveling and grading of soil surfaces is needed to prepare the surface for ulterior work such as asphalting, turfing and so on, any aggregates used as filling material are moved and leveled in a first pass with standard machinery which leaves imperfections that have to be corrected manually using rakes. This is of course labor intensive and time consuming.

There exists a number of grader attachment for use in agriculture and construction alike but they usually involve the use of a shovel as the grading implement. One particular attachment as described in U.S. Pat. No. 4,976,052 can be used as a preliminary step for preparation of a road bed but is not a finishing tool. In fact it is for unprepared soil. The prior art of record shows a number of implements that may, at first glance appear similar but all, except for Canadian patent number 2,215,318 by this inventor, lack an important feature which becomes evident in the method of operation. The present disclosure describes a new and unobvious inventive step over that prior Canadian patent that provides added functionality and is worthy of a patent.

SUMMARY OF THE INVENTION

The object of this invention is to replace manual finishing with a tool which can easily be attached to existing heavy machinery and will provide the proper grading and finishing to the surface.

The adjustable grating attachment operates by executing two actions: The first action is to pull the grating in one direction so that the "V" shape lattice will move the filling material towards the center of the grating and fill holes. The second action is to move in the opposite direction, pushing the grating so that the lattice will now push outside the grid any excess filling material and leave a smooth surface. In the event where rocks or land contour is uneven, a pair of springs are provided to absorb the shock and thus prolong the useful life of the grating since it is less likely to be kinked or worned out prematurely.

Furthermore, to help get an even better finish, on at least one side of the grating but preferably both sides, exists a movable section that is movable in relation to the main grating section. Said movable section is used when a special contour is to be obtained such as contouring mounds or elevated pathways and other such landscaping features.

BRIEF DESCRIPTION OF THE DRAWINGS

FIG. 1 is a front elevation of the grating positioned parallel to a bucket of heavy machinery equipment.

FIG. 2 is a front elevation of the main grating section positioned at an angle to the bucket, with two movable sections arranged at different angles in relation to the main grating section.

FIG. 3 is an isometric view of the spring and piston arrangement.

FIG. 4 is an isometric view showing how the grating can be attached to a bucket.

DETAILED DESCRIPTION OF THE PREFERRED EMBODIMENT

FIG. 1

A grating 1 shown generally is comprised of a main lattice 2 and one or more movable lattice 3. Each of said lattices (2, 3) has "V" patterns. The grating 1 is temporarily attached to a bucket 4 with the help of a pair of hooks 5. A piston 6 is situated between the pair of hooks 5 and there is a pair of stabilizing chains 15 which will be explained later.

FIG. 2

Shows that by adjusting the piston 6, the grating 1 can be angled differently. That is, not necessarily parallel to the ground. By going backwards with the tractor, the tractor is level while the grating 1 will carve a grade in the surface. When moving the tractor forward, for the second pass, since the tractor will now be rolling into the graded surface the grating 1 is readjusted to be parallel to the surface so as not to carve it any further. In this way, subtle angles can be carved in the soil creating grades such as those needed for water shedding. To further carve the soil and create sharp transition and contour lines. One or more movable lattices 3 are connected to and are allowed to move freely in relation to the main lattice 2. Those in the art know that there are multiple means for allowing two separate elements to be attached and yet move in relation to one another such as pins, hooks, hinges and all manners of linkages and furthermore, several means can be employed to move the movable lattices, some manual some automatic. Given the frequent usage of hydraulic pistons in these types of equipment, it is obvious that additional pistons can be used to move and retain a variety of relative positions between the main lattice 2 and the movable lattice 3.

FIG. 3

The main lattice 2 is attached to a linkage assembly 7 which attaches to a pair of springs 9 (only one shown) from the rod 7. Each of said springs 9 is attached to an adaptor 10 (one for each spring 9) and each of said adaptor 10 is comprised of a hook 5 and a back stop 11. Each of the adaptor 10 has a tensioning chain 12 that passes through a chin guide 13 and connects to one of two ends of a piston rod 8, 8'. Moving the piston rod 8 in or out will affect the tension of the tensioning chain 12 which in turn will either compress or release the spring 9. Generally, the more one tensioning chain 12 is tensioned and consequently a spring compressed, the more the other tensioning chain 12' is loosened and its corresponding spring (not shown) is consequently decompressed. This has for effect to change the overal angle of the grating 1 (as per FIG. 2).

FIG. 4

The bucket 4 engages the grating 1 by firstly engaging engaging the hooks 5 and then dropping the back of the bucket so that it rests on the back stop 11, one of a pair of chain tensioner 14 holds the grating 1 firmly to the buket 4. During operation, from the manner in which the grating 1 is balanced in relation with the linkage assembly 7, a pair of stabilizing chains 15 (only one shown) loosely link the grating 1 with the springs 9 to stop said grating 1 (not shown) from dropping down or swaying from side to side.

What is claimed is:

1. An adjustable grating attachment for grading soil comprising:

a main lattice and one or more movable lattices wherein each of said lattices has "V" patterns; a linkage assembly attached to said main lattice; an adaptor; a pair of springs attached to said linkage assembly and said adaptor to absorb shocks; a piston that cooperates with said pair of springs through tensioning chains to change the angle of the main lattice; and means to allow the one or more movable lattices to move in relation to the main lattice selected from the group consisting of pins, hooks, hinges and linkages; said main lattice being operated by retraction and extension of said piston; said piston firstly pulling the main lattice in one direction so that the main lattice will move filling material towards the center of the main lattice and fill holes and secondly, by moving said main lattice an opposite direction, pushing the main lattice so that the main lattice will now push outside the "V" patterns any excess filling material.

2. The adjustable grating attachment for grading soil as described in claim 1 wherein said linkage further comprises:

guides to guide the tensioning chains.

3. The adjustable grating attachment for grading soil as described in claim 1 wherein said adaptor comprises:

a pair of hooks, back stops and chain tensioners adapted to be attached to a bucket from a vehicle.

4. The adjustable grating attachment for grading soil as described in claim 1 comprising:

stabilizing chains connected between said linkage assembly and said adaptor to stop the main lattice from dropping down or swaying from side to side.

* * * * *